United States Patent [19]

Cheiky

[11] Patent Number: 4,894,295
[45] Date of Patent: Jan. 16, 1990

[54] METAL-ALLOY AIR BATTERY

[76] Inventor: Michael C. Cheiky, 1776 Eucalyptus Hill, Santa Barbara, Calif. 93103

[21] Appl. No.: 244,828

[22] Filed: Sep. 14, 1988

[51] Int. Cl.⁴ ............................................. H01M 4/00
[52] U.S. Cl. ....................................... 429/77; 429/35; 429/175
[58] Field of Search ..................... 429/27, 35, 175, 176

[56] References Cited

U.S. PATENT DOCUMENTS

| | | | |
|---|---|---|---|
| 3,697,326 | 10/1972 | Jammet | 429/27 |
| 4,063,007 | 12/1977 | Spiegelberg | 429/126 |
| 4,262,062 | 4/1981 | Zatsky | 429/27 |
| 4,557,983 | 12/1985 | Sauer | 429/27 |
| 4,687,714 | 8/1987 | Oltman et al. | 429/27 |

Primary Examiner—Stephen J. Kalafut
Attorney, Agent, or Firm—Marvin E. Jacobs

[57] ABSTRACT

A metal-air battery has a base for containing the active battery materials and a lid located on top of and fitted with the base. The flexible bottom surface of the base is curved to permit an expansion of the battery container during battery discharge. The air cathode is retained by a ledge in the base as well as by channels in the lid to prevent separation between the electrolyte and the air cathode membrane during battery discharge. An air chamber housing having inlet and outlet air ducts is located above the air cathode membrane for continuous air flow and optimal battery operation. The air ducts are sealed during storage to extend the shelf life of the battery.

19 Claims, 2 Drawing Sheets

METAL-ALLOY AIR BATTERY

BACKGROUND OF THE INVENTION

1. Field of the Invention

This invention relates to batteries, and more particularly to metal air batteries.

2. Description of the Prior Art

Metal-air batteries having an air cathode and a metal or metal alloy anode are increasingly being used for a variety of applications, including the powering of portable electronic equipment such as personal computers.

A major problem with existing metal-air batteries is that the air cathode has a tendency to separate from the electrolyte material over the lifetime of the battery, resulting in the formation of air pockets between the air cathode and the electrolyte. The cause of this separation is as follows. As the metal electrode or anode reacts with the electrolyte during battery operation, a metal oxide or a metal hydroxide is formed. The metal oxide or metal hydroxide has a much larger volume than the metal electrode; the increased volume places pressure on the internal walls of the battery container resulting in an expansion of the container itself. This expansion in turn results in a separation of the air cathode membrane from the electrolyte, and the creation of the air pockets between the air cathode and the electrolyte. The air pockets subtantially interfere with the battery output, and result in premature degradation of the battery.

One attempt to solve the separation problem includes placing a spring at the bottom of the battery container to keep the air cathode membrane and electrolyte layers together. A disadvantage with this approach is that the mechanical spring assembly takes up valuable space within the battery container that would otherwise be used for the active battery materials including the electrolyte and electrodes. The decreased quantities of the active battery materials results in a battery having a lower energy density or smaller output.

Another problem with metal-air batteries is that they require a continuous flow of air across the air cathode membrane for optimal battery operation. The battery's energy output drops dramatically if the flow of air is inhibited or ceases for any reason. It is therefore desirable to provide a metal-air battery whose design enables continuous flow of air across the air cathode membrane.

SUMMARY OF THE INVENTION

A feature and advantage of the metal-air according to the present invention is that the layers of active materials in the battery are prevented from separating without the use of any mechanical devices.

Another feature and advantage of the battery according to the present invention is that the battery container may accommodate the expansion caused by the metal electrode-electrolyte reaction without distortion of the container or separation of the active battery materials.

Yet another feature and advantage of the battery according to the present invention is that a path is provided for continuous air flow across the air cathode membrane for improved battery operation.

Yet another feature and advantage of the metal-air battery is that its container is a lightweight, leak-resistant structure that is easily molded from plastic materials.

These and other features and advantages of the present invention are accomplished in a metal-air battery having a base cavity in the base for holding the active battery elements, and a lid that fits on the base to form a leak-resistant ledge. The base has a flexible and concave bottom surface designed to accommodate expansion within the battery container caused by the reaction of the metal electrode with the electrolyte.

During the assembly of the battery, the metal anode, separators, and electrolyte are placed in the base cavity and are covered by an air cathode membrane. The air cathode membrane fits into the ledge created by the meeting of the lid and the base. The lid and the base are bonded together by heat, an adhesive, or by an ultrasound welding process to lock the air cathode in place in the ledge.

The lid fits over the air cathode membrane and has at least one air chamber housing. The air chamber housing encloses an air chamber having inlet and outlet air ducts. The air chamber housing is either linear or U-shaped to permit air to continuously and easily flow through the air ducts and the air chamber across the air cathode membrane. Channels between adjacent air chamber housings retain the air cathode membrane in place during battery operation.

During discharge of the battery, the metal anode reacts with the electrolyte to become a metal oxide or a metal hydroxide. The metal oxide or metal hydroxide has a lower density and thus a larger volume than the metal used to form the metal anode. The larger volume of the oxide or hydroxide end product places pressure on the inside battery container walls and its active elements, forcing the electrolyte into strong contact with the air cathode membrane. The air cathode membrane is prevented from moving by the channels in the lid and by the ledge into which it fits.

As the battery discharge process continues, the flexible bottom of the base expands to permit the anode and electrolyte to expand in a downward direction. This downward expansion permits a continual microscopic mixing between the anode and the electrolyte to take place, thereby improving battery operation.

The hydrogen gas created from the parasitic corrosion of the metal anode may be allowed to diffuse out of the naturally porous air cathode membrane, or the gas may be catalytically combined with oxygen at the air cathode to form water. The water may in turn be used to replenish the electrolyte. A noble metal such as platinum and palladium is a suitable catalyst for this reaction.

The battery cells may be used alone, or they may be placed side by side or stacked in series connection to generate the desired voltages. The air ducts in the air chamber may be sealed by tape or other means for storage to prevent oxygen, water vapor, carbon dioxide and atmospheric pollutants from entering and degrading the cell.

These and other features and advantages of the invention will be apparent to those skilled in the art from the following detailed description of preferred embodiments, taken together with the accompanying drawings, in which:

DETAILED DESCRIPTION OF PREFERRED EMBODIMENTS

Figure 1:
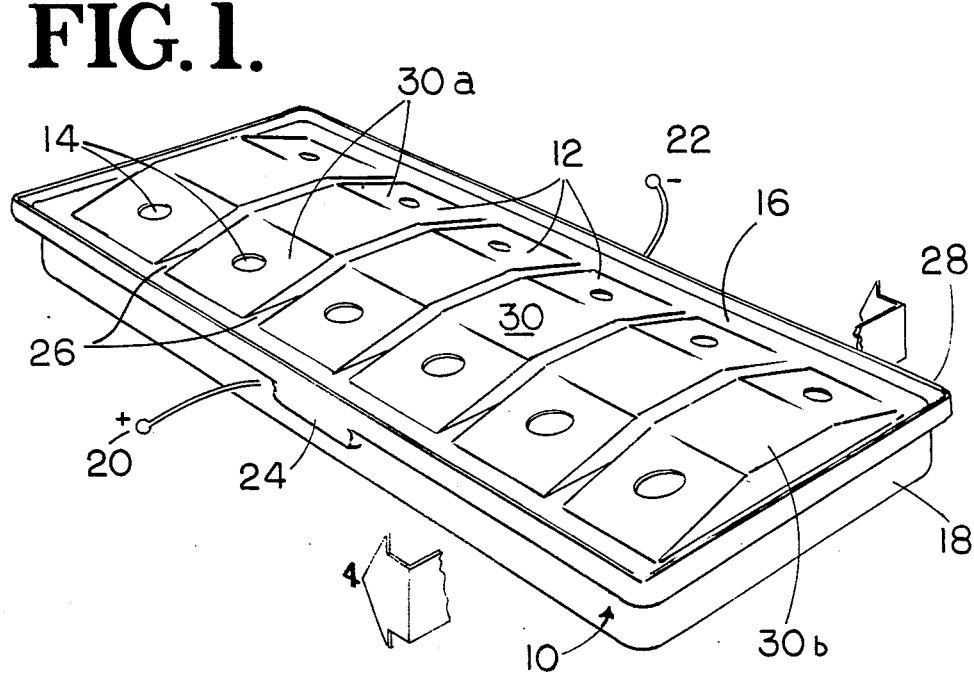
FIG. 1 is a perspective view of a first embodiment of the metal-air battery according to the present invention.

FIG. 1 is a perspective view of a first embodiment of metal-air battery according to the present invention having six battery cells 12. In FIG. 1, the outer container of battery 10 is comprised of a base 18 and a lid 16 that fits in base 18 to form a ledge 28. Base 18 and lid 16 may be made of separate pieces of plastic, or from a single piece having a foldable hinge. In either case, the base and the lid are preferably made out of a structural plastic material such as nylon, polyvinylchloride (PVC), polystyrene, or polypropylene. The battery container may be made by molding, casting, vacuum-forming or pressure forming. Base 18 may include finger tabs 24 that are used to insert lid 16 onto ledge 28 of base 18.

Lid 16 is formed to include a raised air chamber housing 30 for each of the battery cells 12. Air chamber housing 30 defines the boundaries of the air chamber for each of the battery cells. Air chamber housing 30 is comprised of two sloped chamber sections 30a and a flat section 30b in between the two sloped sections. Each of the sloped chamber sections 30a has an air duct 14 which serves either as an inlet or an outlet for air passing across the air cathode membrane (not shown). Battery cells 12 are separated by channels 26 which along with ledge 28, keep the air cathode membrane fixed in its proper location within the battery cell. Battery 10 also has a positive terminal 20 connected to the battery anode and a negative terminal 22 connected to the battery cathode. Terminals 20 and 22 may be connected to any portion of the battery anode and cathode, respectively, and preferably are connected through the seam formed by the meeting of lid 16 and base 18.

The air chamber housings in the first embodiment of the invention are linear so that for each battery cell 12, air passes in one air duct and out the opposing air duct for the same cell. This linear configuration permits air to easily pass through the air chamber particularly if it is propelled by a small fan. Metal-air batteries including battery 10 require a continuous flow of air across the air cathode membrane for optimal battery operation.

Figure 2:
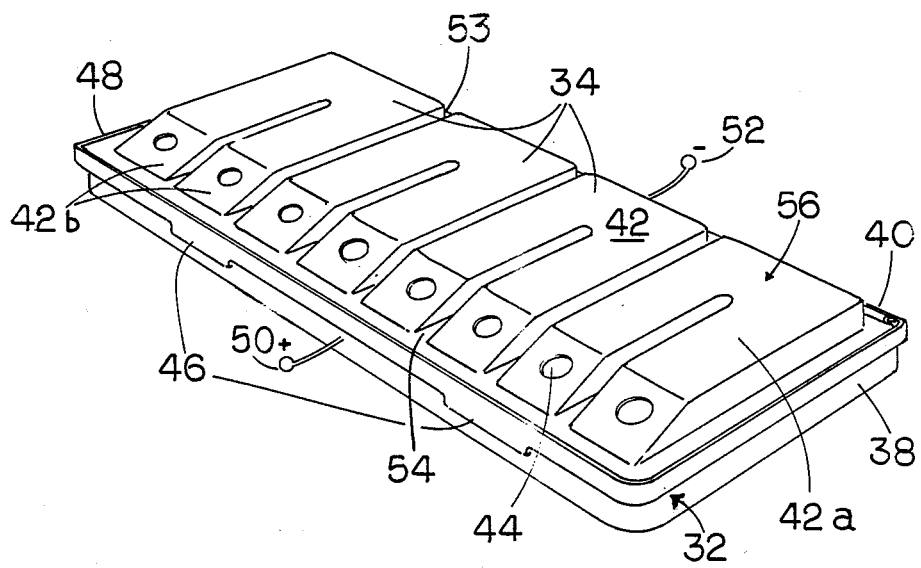
FIG. 2 is a perspective view of a second embodiment of the battery according to the present invention.

FIG. 2 is a perspective view of a second embodiment of the present invention in which the air chamber housings 42, which defines the air chambers, are U-shaped instead of linear as in the first embodiment depicted in FIG. 1. In FIG. 2 a lid 56 fits into a ledge 48 of a base 38. Battery 32 is comprised of four battery cells 34, although any number of cells may be used either in the same battery or in series connection. The boundaries of battery cells 34 are defined by channels 53 located between adjacent air chamber housings 42. Housings 42 are U-shaped, each housing 42 having an air chamber channel 54 between the two legs of the housing. Housing 42 is comprised of a flat chamber section 42a and two sloped chamber sections 42b, each of which has an air duct 44. For each cell 34 one air duct 44 is an inlet, and the other is an outlet. Lid 56 and base 38 may be made from separate pieces of plastic, or they may be from a single piece folded over to create a hinge 40. In either event, finger tabs 46 are used to press lid 56 into ledge 48 of base 38.

Battery 32 is provided with a negative terminal 52 connected to the battery's anode (not shown), and a positive terminal 50 connected to the battery's cathode (not shown). Terminals 50 and 52 may be connected at any point of the cathode and anode, respectively, but preferably pass through the seam created by the joining of lid 56 with base 38.

Figure 3:
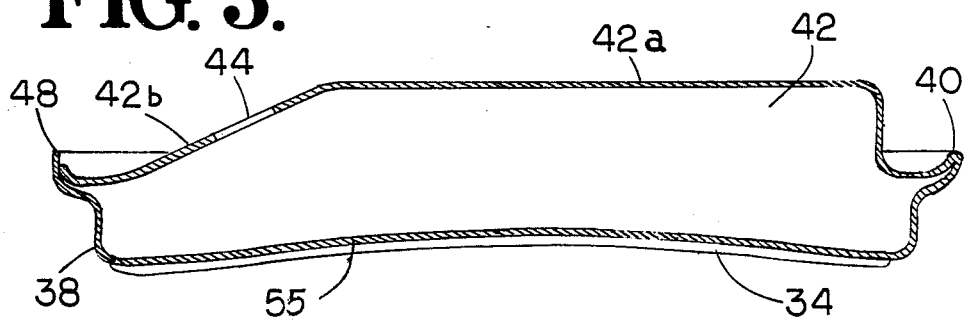
FIG. 3 is a side view of the second embodiment depicted in FIG. 2.

FIG. 3 is a side view of the second embodiment depicted in FIG. 2. In FIG. 3, base 38 has a flexible curved bottom surface 55. The flexible bottom surface 55 may have a concave shape like that depicted in FIG. 3 or a non-planar shape like that depicted as bottom surface 58 in FIG. 4. In either event, the non-planar shape of the bottom surface is designed to keep the air cathode membrane from separating from the electrolyte layer, and to be expandable in the downward direction as needed when the metal electrode reacts with the electrolyte to create the metal oxide or hydroxide having a larger volume than the base metal in the metal electrode.

Bottom surface 55 may also be provided with ribs 34, preferably located beneath channels 53 and 54, to provide additional structural support.

Figure 4:
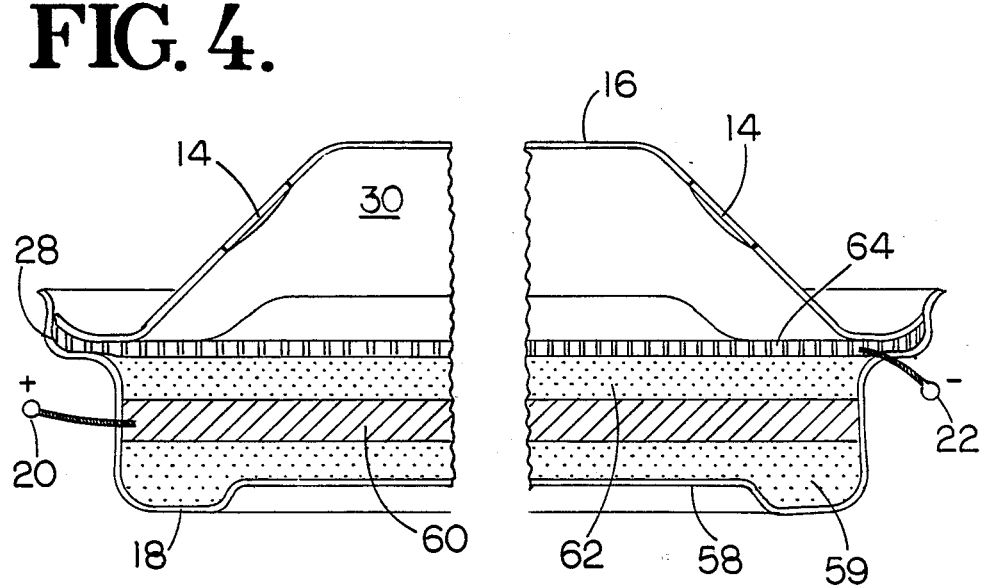
FIG. 4 is a cross-section of the battery depicted in FIG. 1 taken along line 4—4.

The internal components of the battery will be discussed in connection with FIG. 4. FIG. 4 is a cross-section of FIG. 1 taken along line 4—4. In FIG. 4 an electrolyte layer 59 is first deposited in the cavity of base 18, followed by a metal electrode 60 that serves as the battery anode. Metal electrode 60 may be made from various materials, including solid zinc, pressed powdered zinc, aluminum, iron, as well as metal alloys. A second layer of electrolyte 62 may be deposited on metal electrode 60.

On top of electrolyte 62 is an air cathode membrane 64 that fits into ledge 28 and is held in place during battery discharge by channels 26 (FIG. 1). A carbon membrane is preferably used for cathode membrane 64. Above air cathode membrane 64 is an air chamber, which is enclosed by air chamber housing 30. Housing 30 has two air ducts 14, either one of which may serve as an inlet with the other serving as an outlet for a flow of air through the air chamber and across the air cathode membrane 64. The purpose of the air flow is to provide a continuous supply of oxygen required for battery operation.

The battery also has a negative terminal 20 connected to metal electrode 60, and a positive terminal 22 connected to air cathode membrane 64.

After the internal battery components have been placed within the base, the lid is fitted within ledge 28, and the lid and the base are bonded together by any one of a number of processes, including heat, ultrasound welding, hot melt, solvent bonding, or epoxy gluing. This bonding locks the air cathode membrane into place and forms a mechanically rigid structure.

During discharge of the battery, the metal electrode 60 reacts with electrolytes 59 and 62 to become a metal oxide or a metal hydroxide compound. This compound has a lower density and thus a larger volume than the base metal used for electrode 60. The larger volume requirement creates a pressure upon the internal walls of the battery container as well as upon electrolyte 62. This pressure forces electrolyte 62 into strong contact with air cathode membrane 64, thereby avoiding the problem of separation of the electrolyte and the air cathode layer during battery discharge.

As the battery discharge process continues, bottom surface 58 of base 18 expands due to the volume requirement of the metal oxide or metal hydroxide. The expansion of bottom surface 58 causes metal electrode 60 and electrolyte 59 to expand in a downward direction towards the bottom of the base. This downward expansion causes a continual microscopic mixing between metal electrode 60 and electrolyte 59, further increasing the energy density of the battery.

The hydrogen gas by-product from the reaction between the metal electrode 60 and electrolytes 59 and 62 may diffuse out of the naturally porous air cathode membrane 64 into the atmosphere. Alternatively, the hydrogen gas may be catalytically combined with the oxygen in the air at the air cathode membrane 64 to form water. This water may be used to replenish the electrolyte. Suitable catalysts for this reaction include the noble metals, such as platinum and palladium.

Typical metal-air batteries have a tendency to degrade while they are in storage due to the presence of air and other chemicals in the atmosphere. To avoid this problem, the air ducts in the present invention may be sealed by tape or other means for storage to provide a long shelf life. This sealing prevents chemicals such as oxygen, water vapor, carbon dioxide and atmospheric pollutants from entering the battery cells.

While particular embodiments of the invention have been shown and described, numerous modifications and embodiments will occur to those skilled in the art. Accordingly, it is intended that the invention be limited only by the following claims.

What is claimed is:

1. A metal-air battery, comprising: a base having a base cavity therein and having a flexible, substantially concave non-planar bottom surface;
   a lid located on top of said base cavity and joined with said base, said lid including:
   at least one air chamber housing that encloses an air chamber through which air may pass;
   at least one inlet duct in said air chamber housing for allowing air to pass into said air chamber housing;
   at least one outlet duct in said air chamber housing for allowing air to pass out of said air chamber housing;
   an anode located in said base cavity;
   an electrolyte located in said base cavity in chemical reactive proximity to said anode;
   an air cathode located near the junction between said base and said lid, said air cathode being in chemical reactive proximity to said electrolyte;
   a negative terminal connected to said anode; and
   a positive terminal connected to said cathode.

2. The metal-air battery of claim 1, wherein said non-planar bottom surface has support ribs.

3. The metal-air battery of claim 1, wherein said air chamber housing has a linear shape with two ends, said at least one inlet duct being located at one end of the housing and said at least one outlet duct being located at the other end of said housing.

4. The metal-air battery of claim 1, wherein said air chamber housing has first and second legs connected to form a U-shape each leg having an end, said at least one inlet duct being located at the end of the first leg, and said at least one outlet duct being located at the end of the second leg.

5. The metal-air battery of claim 1, wherein said lid also includes at least one channel adjacent to said air chamber housing for retaining said air cathode.

6. The metal-air battery of claim 1, wherein said base also has a ledge near the top of said base cavity for retaining said air cathode.

7. A metal-air battery, comprising:
   a base having a base cavity therein and having a flexible bottom surface that expands during the battery discharge;
   a lid located on top of said base cavity and joined with said base, said lid including:
   a plurality of adjacent air chamber housings, each air chamber housing enclosing an air chamber through which air may pass;
   a plurality of inlet ducts for allowing air to pass into said air chamber housings, at least one inlet duct being located in each of the air chamber housings;
   a plurality of outlet ducts for allowing air to pass out of said air chamber housings, at least one outlet duct being located in each of the air chamber housings;
   at least one channel that separates adjacent air chamber housings;
   an anode located in said base cavity;
   an electrolyte located in said base cavity in cheical reactive proximity to said anode;
   an air cathode located near the junction between said base and said lid, said air cathode being in chemical reactive proximity to said electrolyte;
   a negative terminal connected to said anode; and
   a positive terminal connected to said cathode.

8. The metal-air battery of claim 7, wherein said flexible bottom surface is substantially concave.

9. The metal-air battery of claim 7, wherein said flexible bottom surface has support ribs.

10. The metal-air battery of claim 7, wherein each of said air chamber housings has a linear shape with two ends, at least one inlet duct being located in one end of each housing and at least one outlet duct being located at the other end of each housing.

11. The metal-air battery of claim 7, wherein each of said air chamber housings has first and second connected legs connected to form a U-shape each leg having an end, at least one inlet duct being located at the end of the first leg and at least one outlet duct being located at the end of the second leg.

12. The metal-air battery of claim 7, wherein said channel retains said air cathode during battery discharge.

13. The metal-air battery of claim 7, wherein said base also includes a ledge for retaining said air cathode.

14. A metal-air battery, comprising:
   a casing having a base cavity therein;
   a lid located on top of said casing and joined with said casing, said lid including:
   at least one air chamber housing that encloses an air chamber through which air may pass, said housing including a base and a top joined by side walls;
   at least one inlet duct formed in the side walls of said air chamber housing for allowing air to pass into said air chamber;
   at least one outlet duct formed in the side walls of said air chamber housing for allowing air to pass out of said air chamber;
   an anode located in said base cavity;
   an electrolyte located in said base cavity in electrochemical contact with said anode;
   an air cathode located near the junction between said base and said lid, said air cathode being in electrochemical contact with said electrolyte;
   a negative terminal connected to said anode; and
   a positive terminal connected to said cathode.

15. A metal-air battery according to claim 14 in which at least one of said side walls is slanted inwardly from the base toward the top.

16. A metal-air battery according to claim 15 in which the top is flat.

17. A metal-air battery according to claim 16 in which opposed side walls disposed on either side of the top are slanted toward the top.

18. A metal-air battery according to claim 17 in which at least one air-inlet is provided on one side wall and at least one air outlet is provided on an opposed side wall.

19. A metal-air battery comprising:
a base having a base cavity therein and having a flexible non-planar bottom surface;
a lid located on top of said base cavity and joined with said base, said lid including:
  at least one air chamber housing that encloses an air chamber through which air may pass;
  at least one inlet duct in said air chamber housing for allowing air to pass into said air chamber;
  at least one outlet duct in said air chamber housing for allowing air to pass out of said air chamber;
  said air chamber housing has first and second legs connected to form a U-shape each leg having an end, at least one of said inlet ducts being located at the end of the first leg, and at least one of said outlet ducts being located at the end of the second leg;
an anode located in said base cavity;
an electrolyte located in said base cavity in electrochemical contact with said anode;
an air cathode located near the junction between said base and said lid, said air cathode being in electrochemical contact with said electrolyte;
a negative terminal connected to said anode; and
a positive terminal connected to said cathode.

* * * * *